United States Patent
Ghebru et al.

(10) Patent No.: US 10,144,295 B2
(45) Date of Patent: Dec. 4, 2018

(54) METHOD FOR CHARGING AN ACCUMULATOR OF AN ELECTRICALLY DRIVABLE MOTOR VEHICLE

(71) Applicant: AUDI AG, Ingolstadt (DE)

(72) Inventors: Daniel Ghebru, Ingolstadt (DE); Andreas Djermester, München (DE)

(73) Assignee: AUDI AG, Ingolstadt (DE)

( * ) Notice: Subject to any disclaimer, the term of this patent is extended or adjusted under 35 U.S.C. 154(b) by 114 days.

(21) Appl. No.: 15/435,673

(22) Filed: Feb. 17, 2017

(65) Prior Publication Data
US 2017/0240058 A1   Aug. 24, 2017

(30) Foreign Application Priority Data

Feb. 24, 2016   (DE) .................. 10 2016 202 807

(51) Int. Cl.
*B60L 11/18*   (2006.01)
*B60L 1/00*   (2006.01)
(Continued)

(52) U.S. Cl.
CPC ............ *B60L 11/1809* (2013.01); *B60L 1/00* (2013.01); *B60L 11/1874* (2013.01); *G01S 19/13* (2013.01); *H02J 7/0004* (2013.01); *H02J 7/0021* (2013.01); *H02J 7/0027* (2013.01); *H02J 7/0029* (2013.01); *H02J 7/0047* (2013.01); *H02J 9/061* (2013.01); *B60L 2230/00* (2013.01); *B60L 2240/545* (2013.01);
(Continued)

(58) Field of Classification Search
CPC .... B60L 11/1809; B60L 1/00; B60L 11/1874; B60L 2230/00; B60L 2270/142; B60L 2240/545; H02J 9/061; H02J 7/0047; H02J 7/0021; H02J 7/0029; H02J 7/0027; H02J 7/0004; Y02T 90/14; Y02T 10/7005; Y02T 10/7072; Y02T 10/705; Y02T 10/7055; G01S 19/13
See application file for complete search history.

(56) References Cited

U.S. PATENT DOCUMENTS 6,396,241 B1   5/2002   Ramos et al.
7,222,004 B2 *   5/2007   Anderson ............. B60W 20/15
                                                              701/22

(Continued)

FOREIGN PATENT DOCUMENTS

EP   2572431 B1   3/2013

OTHER PUBLICATIONS

German Office Action dated Feb. 22, 2017, in connection with corresponding German Application No. 102016 202807.3 (4 pgs.).

*Primary Examiner* — Russell Frejd
(74) *Attorney, Agent, or Firm* — Maier & Maier, PLLC

(57) ABSTRACT

A method for charging an accumulator of an electrically drivable motor vehicle, wherein a cooling device of the motor vehicle is operated in order to cool the accumulator during the charging of the accumulator, wherein the motor vehicle emits noise in dependence on the cooling power of the cooling device, including the steps: determining positional data for a position of the motor vehicle during charging, determining a maximum value for a noise emission on the basis of the positional data and while taking into account noise emission positional data, and taking into account the maximum value for noise emission with respect to the charging of the accumulator.

10 Claims, 1 Drawing Sheet

(51) Int. Cl.
*H02J 9/06* (2006.01)
*H02J 7/00* (2006.01)
*G01S 19/13* (2010.01)

(52) U.S. Cl.
CPC ...... *B60L 2270/142* (2013.01); *Y02T 10/7005* (2013.01); *Y02T 10/705* (2013.01); *Y02T 10/7055* (2013.01); *Y02T 10/7072* (2013.01); *Y02T 90/14* (2013.01)

(56) References Cited

U.S. PATENT DOCUMENTS

| | | | |
|---|---|---|---|
| 8,098,040 B1 * | 1/2012 | Botto | B60L 8/006 290/44 |
| 8,195,350 B2 * | 6/2012 | Jinno | B60W 20/13 701/22 |
| 2013/0052490 A1 | 2/2013 | TenHouten et al. | |
| 2016/0090002 A1 * | 3/2016 | Noack | H01M 10/625 307/10.1 |

* cited by examiner

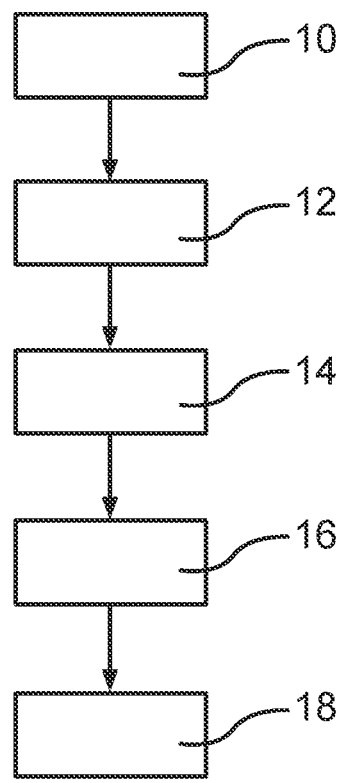

METHOD FOR CHARGING AN ACCUMULATOR OF AN ELECTRICALLY DRIVABLE MOTOR VEHICLE

The invention relates to a method for charging an accumulator of an electrically drivable motor vehicle, wherein during the charging of the accumulator, a cooling device of the motor vehicle is operated to cool the accumulator so that the motor emits noise depending on the cooling power of the cooling device, comprising these steps: determination of the positional data for a position of the motor vehicle during the charging. In addition, the invention relates also to an electrically drivable motor vehicle having an electric drive unit for driving the motor vehicle, an accumulator that is coupled with the electric drive unit, a cooling device for cooling the accumulator, as well as a control unit for determining positional data, wherein the motor vehicle is designed to operate the cooling means during the charging of the accumulator so that the motor vehicle emits noise depending on the cooling output of the cooling device, while the control unit is designed to determine the positional data for a position of the motor vehicle during the charging.

Methods for charging an accumulator of an electrically drivable motor vehicle as well as electrically drivable motor vehicles are very well known from prior art, so that there is no need for a written proof thereof. Motor vehicles of the generic type are for example motor vehicles that can be driven only electrically, for which purpose they are equipped with a corresponding drive unit. Motor vehicles that are drivable only electrically are known from prior art as electric vehicles. In addition, electrically drivable motor vehicles are also motor vehicles that in addition to an electric drive unit are also provided with an internal combustion engine, which can be used alternatively or as a supplement to the electric drive unit for the purposes of driving the motor vehicle. Such motor vehicles are known from prior art as hybrid vehicles.

Electrically drivable motor vehicles are generally equipped with an electric energy storage device that makes it possible to supply electric energy to the electric drive unit of the motor vehicle during the regular driving operations of the motor vehicle. On the whole, the energy storage device is being increasingly emptied during the operation of the electrically drivable motor vehicle until the electric energy storage device reaches a charging state in which it must be charged again before the motor vehicle can continue its regular driving operations. The energy storage device is usually equipped with an accumulator, such as for example a high-voltage battery or the like. The accumulator is connected to the electric system of the motor vehicle so that the electric drive unit can be supplied with electric energy by the accumulator.

In order to charge the accumulator, the electrically drivable motor vehicle is brought into the vicinity of a charging station and coupled with the station electrically, so that the accumulator of the motor vehicle can be charged with the electric energy from the charging station. The electric motor vehicle is usually turned off during this operating status, which means that the driving speed of the motor vehicle is zero. The charging of the accumulator is therefore carried out outside of the specific driving operations of the motor vehicle. In order to perform charging, the electric coupling between the motor vehicle, or its electric system, and the charging station which is to be provided, can be designed for example by means of an alternating magnetic field or the like. For example U.S. Pat. No. 6,396,241 discloses an inductive charging system that is based on an alternating magnetic field used to create electric coupling that is generated by a transformer coil. A vehicle-side coil, which is arranged as close as possible to the transformer coil opposite to it, is exposed to the magnetic alternating field and it generates alternating voltage at its connections on the vehicle side. This voltage is converted in a suitable manner in the motor vehicle, so that the accumulator can be connected. Electric energy is thus supplied from the charging station to the accumulator.

In addition, EP 2 572 431 B1 discloses a charging system for electric vehicles having a plurality of charging stations, in which power converters and charging stations can be arranged independently of each other and at a distance from one another. As a result, the noise emitted by the charging station during the charging can be reduced and the air currents required to generate cooling are avoided.

Although the methods according to prior art have proven to be successful, they still have disadvantages. During the charging of a high-voltage battery, in particular in the case of rapid charging, and in particular with highly electrified motor vehicles, suitable cooling is required to protect the structural units contained in the motor vehicle. The heat losses occurring during the charging are increased quadratically with the charging current and therefore are proportional to the charging power. In order to provide cooling, the motor vehicle is equipped with a cooling device that is operated in particular to cool the accumulator. The result of the operation of the cooling device is that cooling device noise is emitted by the motor vehicle depending on the cooling power of the cooling device. With a generic cooling device, for example an air-conditioning system of a motor vehicle, the cooling output is dependent on the dimensions of the structural elements such as an electric air conditioning compressor, a chiller, a condenser, a radiator fan and/or the like. In particular, the operation of the electric air-conditioning compressor as well as of the radiator fan result in acoustic emissions or noise emissions, which must be limited depending on the location. With large charging outputs, this can lead to a deviation related to the cooling output, namely between a theoretical maximum cooling output and a cooling output that can be acoustically tolerated. Due to maximum values for acoustic limits for the emission of noise, the charging power can be reduced. This then results in a longer charging time for the high-voltage battery.

Since the emission of noise must be at least partially subject to limits, which are among other factors also determined by statutory regulations, an unrestricted accumulator charging operation is not always possible. For example, charging of accumulators of vehicles may be prohibited in residential areas, especially at night, in order to limit the noise pollution in the vicinity of the motor vehicle.

The objective of the invention is to provide an improved method for charging an accumulator with respect to emission of noise by the motor vehicle and to indicate a corresponding motor vehicle.

Other advantageous embodiments of the invention result from the features of the dependent claims.

With respect to the method, a generic method is proposed, which comprises the following steps: determining a maximum value for noise emission based on positional data, while taking into consideration noise emission positional data, as well as taking into account the maximum values for the noise emission regarding the charging of accumulator.

With respect to the vehicle, it is in particular proposed that the control unit be designed on the basis of the determined positional data, while taking into account noise emission positional data in order to determine a maximum value for a noise emission, and to take into account the maximum value for noise emission with respect to the charging of the accumulator.

This therefore takes into account the noise emission of the motor vehicle generated during the charging of the accumulator. By taking into account the vehicle-side noise emission and its dependence on the cooling output of the cooling device of the motor vehicle, the emission of the noise during the charging of the accumulator can be adapted in such a way so that the maximum value of the noise emission will not be exceeded. As a result, special requirements regarding protection from noise can be taken into account. At the same time, the invention also makes it possible to achieve a short charging time of the accumulator while taking into account protection from noise. For this purpose, the invention combines determined positional data with the noise emission positional data. For example, there is the possibility to reduce the noise emission by the accumulator during the downloading with an intervention on the side of the vehicle. In addition, there is of course also the possibility to determine and select a corresponding location for the charging of the accumulator that corresponds to permissible noise emission.

Noise emission positional data are data that assign the maximum value for noise emission to one positional data set or to several positional data sets. The noise emission positional data can be provided for example in the form of a database, a noise map, or a combination thereof or the like. Positional data are assigned to positions that are mutually adjoining and in which the same maximum value is assigned for noise emission, but this data can be also included as noise zones. The formation of zones makes it possible to further simplify the method.

The cooling device of the vehicle can be formed for example by a cooling fan or the like.

However, it can additionally also include an air-conditioning system, which receives heat from accumulator and delivers it to another location of the motor vehicle, for example to the ambient air or to another heat sink. The air-conditioning device can be for example an air-conditioning device that is used to cool the interior of the motor vehicle. It is controlled so that the air-conditioning device is controllable by a control device in such a way that it can be used in order to cool the accumulator during the charging of the accumulator. For this purpose, suitable connection options are provided for guiding a cooling fluid of the cooling device.

With the operation of the cooling device, which can include in addition to the cooling fan also an air-conditioning system and other cooling device, noise is generated, which is preferably partially suppressed by the motor vehicle. This noise can be detected by means of a noise sensor on the side of the motor vehicle and a corresponding noise signal can be provided for the control unit. The control unit can then accordingly intervene to reduce the noise emission as long as this is necessary.

In addition, the positional data for a position of the motor vehicle during the charging are detected. The positional data can be determined for example during the actual process of charging, which is to say when for instance the motor vehicle is positioned or electrically coupled at a charging station, but the data can be also detected for a position of the motor vehicle during recharging that is still to be assumed, for example when the motor vehicle is in the intended driving mode and it is about to drive up to a charging station. In this case it is possible to determine the positional data of the charging station. For determining the positional data, the motor vehicle can use its own position determination systems such as a GNSS (Global Navigation Satellite System) receiver or the like, which can be for example radio-based. However, manual input of the user can be also enabled, for example on a navigation device of the motor vehicle or the like. For this purpose, the maximum value for the noise emission at the relevant position can be determined and then output, for example to the driver of the motor vehicle. The driver can then decide whether or which charging stations should be approached. According to the invention, a maximum value for noise emission is determined on the basis of the positional data while taking into account the noise emission positional data. The determined maximum value for noise emission can then be taken into account with respect to the charging of the accumulator. This can be done by a control unit, which is in particular designed to ensure that the maximum value for noise emission during the process when the accumulator is being charged will not be substantially exceeded. In particular, predicative route data, for example GPS (Global Positioning System) positional data, POI (Point of Interest) positional data and the like can be used in order to determine whether the motor vehicle is going to find during the charging operational locations relevant to acoustic emission, namely locations where noise emission is tolerated, or locations that are sensitive to noise emissions. If the motor vehicle is located during the charging of the accumulator for example in the center of a city, for example near a highly frequented pedestrian zone, near a street café, an ice cream parlor or the like, the maximum value for noise emission can be reduced. With a targeted use of the control unit it is then possible to reduce the maximum value of the noise emission with a permissible rotational speed, for example of the electric climatic compressor, of the radiator fan and/or the like, so that a reduced air-conditioning power can be provided for the accumulator during the charging of the accumulator. Since the charging current during the charging of the accumulator is among other things dependent also on the temperature of the accumulator, it follows that with a reduced cooling output, the maximum permissible charging current and therefore also the charging voltage can be reduced when compared to a state in which the maximum cooling power is available. Accordingly, the charging time for supplying a predetermined electric charge to the accumulator is extended.

On the other hand, in a position near a highway resting place where a high level of noise is present in any case, a correspondingly high cooling power is provided because a maximum value for the noise emission is also high in such a case. In particular, the maximum cooling power can be made available. This makes it possible for example to select a correspondingly high setting of the maximum value for the rotational speed of the air-conditioning compressor, of the radiator fan and/or the like, or to adjust the maximum value so that a correspondingly high cooling power can be provided for the cooling of the accumulator. As a result, a correspondingly high charging current and thus also a correspondingly high charging voltage can be provided, so that the charging time is then also reduced. The same considerations are applicable also to other units of a cooling circuit, which belong for example to an electric powertrain, or to drive units, and which may also require cooling during the charging processes of the accumulator.

Overall, the invention thus makes it possible to achieve that the noise emitted by the motor vehicle will be taken into account during the charging of the accumulator, so that the overall effect on the environment can be reduced. This also increases the acceptance of charging stations in the public sphere as well as in the private sphere.

According to another embodiment of the invention, it is proposed that the cooling power be adjusted in such a way that the noise emission by the motor vehicle will be limited based on the operation of the cooling device to the maximum value for the noise emission. The taking into account of the maximum value for the noise emission with respect to the charging of the accumulator is done also here by adjusting the cooling power of the cooling device, which can be adjusted accordingly, for example by means of the control unit of the motor vehicle. For this purpose, the positional data are determined on the side of the motor vehicle during the charging of the accumulator, and a value is determined for the determined positional data for the maximum noise emission on the basis of the noise emission positional data.

The noise emission of the motor vehicle can be a vehicle-individual value that is dependent on the cooling power, so that the emitted noise is also increased when the cooling output is being increased. The noise emission of the motor vehicle can be in particular dependent also on the individual type of the motor vehicle, as the motor vehicles of the same type also display essentially the noise emission within the same range of conditions. This makes it possible to create individual or type-specific fields or characteristic curves, which are assigned to the cooling power of a corresponding noise emission of the vehicle.

According to another embodiment of the invention, the positional data is determined as motor vehicle positional data by means of a GNSS (Global Navigation Satellite System) receiver of the motor vehicle. The GNSS receiver can be for example a receiver for the NAVSTAR GPS (Global Positioning System), the Galileo System, the Beidou System or the like. When suitable signals are received, the position of the motor vehicle can be determined with a high precision, which means that the position of the motor vehicle during the charging can be also determined with respect to the range of the noise zones. This makes it possible for example to move the motor vehicle very slightly to position it in a noise zone in which a higher maximum value is permissible for emission of noise, for example when the charging station is located in a border region between two noise zones which have different maximum values for emission of noise. This situation can occur for example when the motor vehicle is to be charged in a garage entrance in a residential area. If, on the other hand, the vehicle is moved only slightly, namely into the garage and the garage door is closed, a significantly higher value for noise emission is permissible. It is particularly advantageous when the motor vehicle positional data is determined by means of an automatic emergency call system such as eCall (emergency call). A separate GNSS receiver is then no longer required.

According to another embodiment, the adjustment of the cooling power is performed on the basis of a characteristic curve field while taking into account the temperature outside in the area of the position of the motor vehicle. It is advantageous when a separate sensor is not required for the adjustment of the noise emission of the motor vehicle during the charging of the accumulator. At the same time, taking into account the external temperature in the area of the position of the motor vehicle, in particular during the charging, makes it possible to further improve the adjustment of the cooling power. So for example, with a low external temperature, the cooling power is increased because as a rule, the cooling device outputs the heat into the ambient air. The effect of the cooling device can be therefore dependent also on the temperature outside, which is to say the temperature of the external air. The temperature outside can be determined by means of a temperature sensor on the side of the motor vehicle, but also by means of a remote data connection, for example a wireless connection, from a communication network such as the internet or the like, or from a corresponding databank for the positional data. In addition, the characteristic curve field can be also made dependent on the external temperature, so that the adjustment of the cooling power through the control device is significantly improved.

In particular, the characteristic curve field can be designed so that it is vehicle-specific. It is preferred when the characteristic curve field is created by the manufacturer of the motor vehicle. However, it can be also created or updated during the maintenance of the motor vehicle or the like. The latter can take into account the fact that the noise emission of the motor vehicle changes with increasing age of the motor vehicle, for example deteriorates.

According to a further development of the invention, the noise emission positional data are generated so that the noise emission positional data is superimposed on map data available in the motor vehicle. The generation of the noise emission positional data can thus be realized in a simple manner. Naturally, a separate data file with corresponding noise emission positional data can be also provided. Preferably, the noise emission positional data is available in the motor vehicle, so that a separate communication connection is not required in order to obtain or generate the noise emission positional data. This configuration is particularly preferred when the motor vehicle is already provided with its own map data, for example in a navigation device on the side of the motor vehicle or the like. In this case, the noise emission zone data only needs to be added by superimposing the map data on it, so that a maximum value can be determined for the noise emission immediately also with the determination of the positional data. The noise emission zone data can be for example provided in the motor vehicle for example already by the manufacturer. The noise emission zone data can also take into account additionally at least existing noise protection regulations based on political realities or administrative units. In particular, emission zone maps can be also superimposed on the map data available in the motor vehicle. Such a noise emission zone data map can be also updated when a communication connection is available with a corresponding databank, for example during the maintenance of the vehicle or the like.

According to a further embodiment of the invention, the charging station positional data is provided as positional data of at least one charging station within the range of the motor vehicle with regular driving operations, and at least one charging station that can provide charging capacity is determined, which is followed by taking into account the maximum value for the noise emission with a maximum value for the noise emission within the range for the permissible noise emission of at least one charging station. This makes it possible to make available to the driver of the motor vehicle information about which charging conditions are available at a charging station. For example, the charging time can be determined with a control unit for a certain energy amount, which is output together with the charging station positional data. If several charging stations are available, the driver can make a suitable selection, for example with respect to the shortest charging time, for the largest possible charging power or the like. The charging unit can for this purpose also take into account the characteristic curve field, as well as the ambient temperature in the area of the relevant charging station. It is thus possible for the driver to select specifically the charging station that can provide the best charging features from his point of view.

In addition, it is also proposed that at least one charging time period is determined for at least one charging station while taking into account the charging power that can be provided by the charging station and the maximum value for the emission of noise in the area of the charging station. The determination of the charging time is preferably performed by the control unit, which determines and outputs a charging time period that is station-specific. The charging time period can additionally also be dependent on other factors, for example on the external temperature, the time of day and/or the like.

It has proven particularly advantageous when a current external temperature in the area of the charging station is taken into account in order to determine the charging time period. The charging time period and/or the charging power can thus be matched more precisely. In particular, the weather forecast can be also taken into consideration to make it possible to determine an even more precise charging time period.

Further advantages and features can be obtained from the description of an embodiment below.

The single FIGURE indicates in a schematic flowchart a process sequence according to the invention.

The single FIGURE shows a schematic process sequence according to the invention. The process starts in step 10 with the charging of an accumulator of an electrically drivable motor vehicle, which is in the present case an electric vehicle. The electric vehicle, as well as its components, are not shown in the FIGURE. The electric vehicle is equipped with an electric drive unit for driving the electric vehicle, as well as with a an accumulator that is electrically coupled with the drive unit—in the present case it is a high-voltage battery, and with a cooling device for cooling the accumulator—in the present case an air-conditioning device, and with a control device for determining the positional data. The electric vehicle is configured to operate the air-conditioning device during the charging of the accumulator during step 10, wherein the electric vehicle emits noise that is dependent on the cooling power of the air-conditioning device.

The control unit is configured to determine in step 12 the positional data for a position of the electric vehicle during charging. An eCall system, arranged in the electric vehicle, is used for this purpose.

In accordance with the invention, the control unit is configured to determine in step 14 based on the determined positional data the maximum value for noise emission, while taking into account noise emission positional data, which is provided in the motor vehicle positional data. The value for noise emission is taken into account with respect to the charging of the accumulator in step 16, in which the cooling power of the air-conditioning device is adjusted in such a way that the noise emission of the electric vehicles is limited to the maximum value for noise emission on the basis of the operation of the air-conditioning device.

The adjustment of the cooling power is carried out in step 18 based on the characteristic curve field while taking into account an external temperature in the area of the position of the motor vehicle. The characteristic curve field was stored already at the manufacturing factor in the motor vehicle. Therefore, the electric vehicle does not need a noise sensor in order to determine the current noise emission generated by the electric vehicle. The control unit adjusts the cooling power on the basis of the characteristic curve field.

In the present case, it is further provided that the characteristic curve field also takes into consideration external temperature. The adjusting function is thus further improved in this manner. Accordingly, the characteristic curve field is created in such a manner that the required data is made available depending on the external temperature. The external temperature is determined by means of a vehicle-side temperature sensor and made available to the control unit. The control unit can thus retrieve temperature-related data from the characteristic curve field and apply it to the adjustment of the cooling power.

When the electric vehicle is located in the center of a city during the charging operation in the first case mentioned above, for example next to a busy pedestrian zone, the control unit can maintain the maximum value for the noise emission of the electric air-conditioning compressor, which is in this case reduced, with targeted lowering of the rotational speed. As a result, however, only a reduced cooling power will be provided for the high-voltage battery. For that reason, the maximum charging current for the high-voltage battery and the voltage output is limited. Accordingly, the charging time is increased with a predetermined energy amount.

In the second case, the electric vehicle is positioned at a charging station of a highway resting area. A correspondingly higher noise level or maximum value is permitted here for the noise emission. This makes it possible to set the rotational speed for the electric air-conditioning compressor and for the cooling fan very high, so that a correspondingly high cooling power is available also for the high-voltage battery. As a result, a correspondingly higher charging current can be realized, as well as correspondingly higher charging power, so that the charging time is reduced.

The embodiment is merely intended to illustrate the invention and it is not limiting with respect to the invention. The functions can naturally vary, in particular also with respect to the adjustment of the cooling device, without departing from the concepts of the invention. Finally, it should be noted that the method according to the invention, the advantages and features, as well as embodiment apply equally also to the corresponding motor vehicle and vice versa. In particular, the features of the method can be applied to the corresponding device features and vice versa.

The invention claimed is:

1. Method for charging an accumulator of an electrically drivable motor vehicle, wherein a cooling device of the motor vehicle is operated during the charging of the accumulator in order to cool the accumulator, wherein the motor vehicle emits noise in dependence on a cooling power of the cooling device, comprising the steps:
   determining positional data for a position of the motor vehicle during charging, characterized by the steps:
   determining a maximum value for a noise emission on the basis of the positional data, while taking into account the noise positional data, and
   taking into account the maximum value for the noise emission with respect to the charging of the accumulator.

2. Method according to claim 1, wherein the taking into account of the maximum value for the noise emission by adjusting the cooling power of the cooling device is carried out in such a way that the noise emission of the motor vehicle is limited to the maximum value for noise emission based on the operation of the cooling device.

3. Method according to claim 2, wherein the adjustment of the cooling power is carried out on the basis of a characteristic curve field, while taking into account an external temperature in the area of the position of the motor vehicle.

4. Method according to claim 3, wherein the characteristic curve field is produced in a manner that is specific to an individual vehicle.

5. Method according to claim 1, wherein motor vehicle positional data is determined as positional data by means of a GNSS receiver of the motor vehicle.

6. Method according to claim 1, wherein the noise emission positional data are generated by superimposing the noise emission zone data on the map data available in the motor vehicle.

7. Method according to claim 1, wherein charging station positional data of at least one charging station within the range of the motor vehicle that can be obtained with regular driving operations and provided by at least one charging station is determined as charging station positional data and taken into account, followed by determining the maximum value for noise emission through a maximum value for noise emission in the area of at least one charging station.

8. Method according to claim 7, wherein a charging time period is determined for at least one charging station, while taking into account at least the available charging capacity of the charging station and the maximum value for the noise emission in the area of the charging station.

9. Method according to claim 8, wherein a current external temperature in the area of the charging station is taken into account in order to determine the charging time.

10. Electrically drivable motor vehicle, comprising:
an electric drive unit for driving a motor vehicle, with an accumulator that is electrically coupled with the drive unit, a cooling device for cooling the accumulator, as well as with a control unit for determining positional data, wherein the motor vehicle is configured to operate the cooling device during the charging of the accumulator, wherein the motor vehicle emits noise in dependence on the cooling power of the cooling device, wherein the control unit is configured to determine the positional data for a position of the motor vehicle during the charging,
wherein the control unit is configured to determine a maximum value for noise emission on the basis of the determined positional data, while taking into consideration noise emission positional data, and a maximum value for noise emission with respect to charging of the accumulator.

* * * * *